United States Patent
Heo et al.

(10) Patent No.: US 11,416,763 B2
(45) Date of Patent: Aug. 16, 2022

(54) METHOD OF TRAINING CLASSIFIER AND DETECTING OBJECT

(71) Applicant: Samsung Electronics Co., Ltd., Suwon-si (KR)

(72) Inventors: Jingu Heo, Yongin-si (KR); Dong Kyung Nam, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1427 days.

(21) Appl. No.: 15/019,146

(22) Filed: Feb. 9, 2016

(65) Prior Publication Data

US 2017/0053211 A1 Feb. 23, 2017

(30) Foreign Application Priority Data

Aug. 21, 2015 (KR) .................. 10-2015-0117861

(51) Int. Cl.
*G06N 20/20* (2019.01)
*G06N 20/00* (2019.01)

(52) U.S. Cl.
CPC ............ *G06N 20/00* (2019.01); *G06N 20/20* (2019.01)

(58) Field of Classification Search
None
See application file for complete search history.

(56) References Cited

U.S. PATENT DOCUMENTS

| | | | |
|---|---|---|---|
| 6,301,370 | B1 | 10/2001 | Steffens et al. |
| 8,648,959 | B2 | 2/2014 | Capata et al. |
| 8,874,372 | B1 | 10/2014 | Zhu et al. |
| 2008/0285849 | A1* | 11/2008 | Lu .................. G06K 9/00234 382/166 |
| 2012/0114179 | A1 | 5/2012 | Okada et al. |
| 2015/0206018 | A1* | 7/2015 | Cho .................. G06K 9/00818 382/161 |

FOREIGN PATENT DOCUMENTS

| | | | |
|---|---|---|---|
| JP | 2010520542 | A | 6/2010 |
| KR | 20070118830 | A | 12/2007 |
| KR | 20080078292 | A | 8/2008 |
| KR | 10-2009-0119664 | A | 11/2009 |
| KR | 20110032846 | A | 3/2011 |
| KR | 20130002869 | A | 1/2013 |
| KR | 10-1476799 | B1 | 12/2014 |
| KR | 101506155 | B1 | 3/2015 |

OTHER PUBLICATIONS

Ma, Yong and Xiaoqing Ding. "Robust Real-Time Face Detection Based on Cost-Sensitive Adaboost Method" IEEE 2003 [Online] Downloaded Jul. 15, 2020 (Year: 2003) file:///C:/Users/brifkin/Documents/e-Red%20Folder/15019146/Ma%20reference.pdf.*

(Continued)

*Primary Examiner* — Ben M Rifkin
(74) *Attorney, Agent, or Firm* — Harness, Dickey & Pierce, P.L.C.

(57) ABSTRACT

A classifier training method includes detecting error data from training data; and training a classifier configured to detect an object based on the error data.

11 Claims, 8 Drawing Sheets

(56) References Cited

OTHER PUBLICATIONS

Chapire, Robert E. "A Brief Introduction to Boosting" Proceedings of the Sixteenth INternational Joint Conference on Artificial Intelligence. 1999 [Online] Downloaded Nov. 16, 2020 http://rob.schapire.net/papers/Schapire99c.pdf (Year: 1999).*

Lee, Younghyun. "Reinforced Adaboost Learning for Object Detection with Local Pattern Representations" 2003 [Online] Downloaded Oct. 8, 2021 https://downloads.hindawi.com/journals/tswj/2013/153465.pdf (Year: 2003).*

Kidera, Takuya. "An incremental Learning Algorithm of Ensemble Classifier Systems" 2006 [Online] Downloaded Oct. 8, 2021 https://ieeexplore.ieee.org/stamp/stamp.jsp?tp=&arnumber=1716567 (Year: 2006).*

Zhang et al., "Face Detection Based on Multi-Block LBP Representation," Advances in Biometrics, 2007, vol. 4642, p. 11-18.

Viola et al., "Rapid Object Detection using a Boosted Cascade of Simple Features," Accepted Conference on Computer Vision and Pattern Recognition, 2001, p. 1-9.

Notice of Preliminary Rejection dated Jul. 14, 2021 in Korean Application No. 10-2015-0117861.

* cited by examiner

METHOD OF TRAINING CLASSIFIER AND DETECTING OBJECT

CROSS-REFERENCE TO RELATED APPLICATION

This application claims under 35 U.S.C. § 119 to Korean Patent Application No. 10-2015-0117861, filed on Aug. 21, 2015, in the Korean Intellectual Property Office, the entire contents of which are incorporated herein by reference in its entirety.

BACKGROUND

1. Field

At least one example embodiment relates to a method of training a classifier and a method of detecting an object using a trained classifier.

2. Description of the Related Art

An object detecting method is used to detect an object included in various sets of data. The object may include various sets of data on a target object, for example, a human, a face, an eye, and a vehicle, to be detected along a pattern of, for example, an image and a voice. For example, an image-based object classifier may automatically detect an object included in an image. The object classifier may detect an object included in an input image by classifying a type of object in the input image. Such an object classifier may be trained based on multiple sets of training data, and a method of the training may determine performances and costs of the object classifier. Thus, there is a desire for a method of training a high-efficiency object classifier at a low cost.

SUMMARY

At least one example embodiment relates to a classifier training method.

In at least one example embodiment, the method may include detecting error data from training data, and training a classifier configured to detect an object based on the error data.

The error data may include at least one of first error data to be detected when an object included in the training data is not classified, and second error data to be detected when the object included in the training data is misclassified as another object.

The detecting may include detecting the error data by classifying the training data using a first classifier trained based on the training data.

The detecting may include training the first classifier based on the training data, detecting the first error data by classifying the training data using the first classifier, training a second classifier based on the first error data, and detecting the second error data by classifying the training data using the second classifier.

The training may include training the classifier based on the second error data.

The second error data may include data to be detected when the object is classified by the first classifier and not classified by the second classifier, and data to be detected when the object is not classified by both the first classifier and the second classifier.

The training may include verifying the trained classifier.

The verifying may include adjusting a parameter of the classifier to allow a false acceptance rate (FAR) to be less than or equal to a preset threshold value.

The training data may include positive data and negative data at a preset ratio.

At least one example embodiment relates to an object detecting method.

In at least one example embodiment, the method may include receiving input data, and detecting a target object from the input data using a classifier trained based on error data.

The error data may be detected by training a first classifier using training data and classifying the training data using the first classifier.

The error data may be detected by training the first classifier using the training data, classifying the training data using the first classifier to detect first error data, training a second classifier using the first error data, and classifying the training data using the second classifier.

The method may further include training the first classifier using the training data, detecting the error data by classifying the training data using the first classifier, and training the classifier using the error data.

The method may further include training the first classifier using the training data, detecting the first error data by classifying the training data using the first classifier, training the second classifier using the first error data, and detecting the error data by classifying the training data using the second classifier, and training the classifier using the error data.

At least one example embodiment relates to a classifier training apparatus.

In at least one example embodiment, the apparatus may include a memory configured to store training data, and a trainer configured to detect error data from the training data and train a classifier configured to detect an object based on the error data.

The trainer may detect the error data by classifying the training data using a first classifier trained based on the training data.

The trainer may detect first error data by training the first classifier based on the training data and classifying the training data using the first classifier, and detect second error data by training a second classifier based on the first error data and classifying the training data using the second classifier.

The trainer may train the classifier based on the second error data.

The trainer may adjust a parameter of the classifier to allow an FAR to be less than or equal to a preset threshold value.

The training data may positive data and negative data at a preset ratio.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims.

The accompanying drawings are not to be considered as drawn to scale unless explicitly noted.

DETAILED DESCRIPTION

Figure 1:
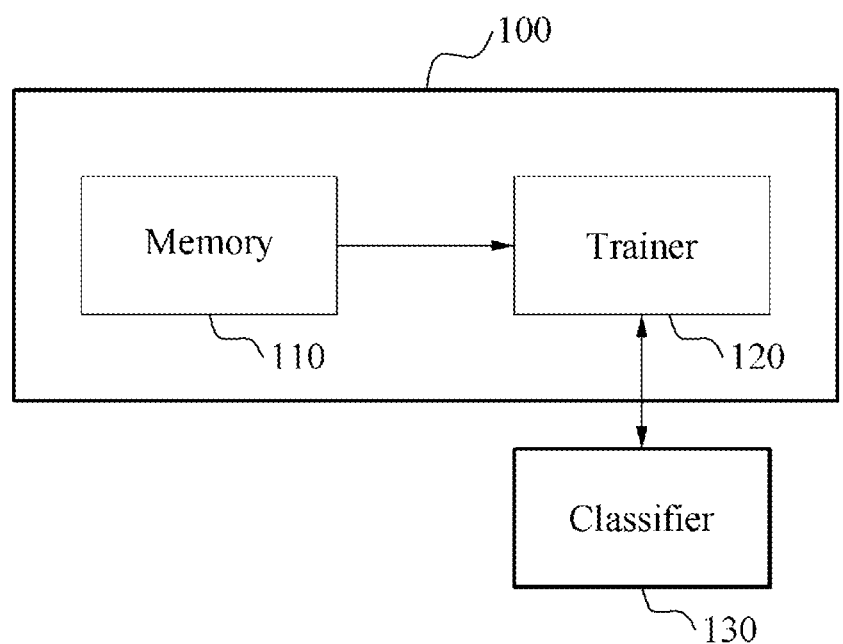
FIG. 1 is a diagram illustrating a classifier training apparatus according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

The example embodiments to be described hereinafter may be applicable to detect an object. For example, the example embodiments may be used to detect a face of a user from input data. A face detecting method according to at least one example embodiment may be used as various forms, for example, changing camera settings including automatic focus adjustment, and face tagging and facial recognition. According to at least one example embodiment, a high-performance classifier configured to detect an object may be trained effectively.

FIG. 1 is a diagram illustrating a classifier training apparatus 100 according to at least one example embodiment.

Referring to FIG. 1, the classifier training apparatus 100 includes a memory 110 and a trainer 120. The memory 110 stores training data. The memory 110 provides the training data to the trainer 120. The memory 110 may be a nonvolatile memory such as a hard disk drive (HDD), a solid state drive (SSD), and a flash memory, or a volatile memory such as a dynamic random access memory (DRAM). The training data may include positive data related to a target object and negative data unrelated to the target object. For example, when a target for training and detection is a face of a user, the positive data may include various human facial images and the negative data may include images of other objects which are not human faces. Although described in detail hereinafter, the training data may include a greater amount of the negative data than the positive data to improve performance of a classifier 130.

The trainer 120 is configured as at least one software module, at least one hardware module, or various combinations thereof. For example, the trainer 120 may be configured as a single processor or multiple processors that execute(s), for example, program code including instructions corresponding to any or all operations described in the present disclosure as being performed by a trainer. For another example, the trainer 120 may be configured as a combination of a processor and a hardware accelerator (HWA). For still another example, the trainer 120 may be configured as a plurality of modules included in different devices. In such an example, the modules may be connected to one another through, for example, a network.

The trainer 120 trains the classifier 130 based on error data. The classifier 130 may include various machine learning models such as, for example, a support vector machine (SVM), a neural network (NN), a Harr-like feature, a local binary pattern (LBP), and an adaptive boosting (AdaBoost), and deep learning. Hereinafter, "train or training a classifier" may be construed as "train or training a parameter of the classifier." In addition, a "trained classifier" may be construed as a "classifier to which a trained parameter is applied."

The trainer 120 detects the error data from the training data, and trains the classifier 130 based on the error data. The error data indicates data obtained when detection of a target object from the training data fails. Hereinafter, an object desired to be detected through the classifier 130 will be referred to as a target object.

The training data may include image data, speech data, or various combinations thereof. The target object may include a face of a user, an eye of the user, a voice or speech of the user, and an object such as a vehicle. The trainer 120 may reduce training time used to train the classifier 130 by training the classifier 130 based on the error data. In addition, using such an error data may enable training of a large sample size, and thus performance of a trained classifier may be improved.

The trainer 120 trains the classifier 130 through multiple stages. Thus, accuracy of a classifier finally trained based on multiple sets of error data detected at the multiple stages may be improved and a training time for the classifier 130 may be reduced through adjustment of the number of sets of the error data.

Figure 2:
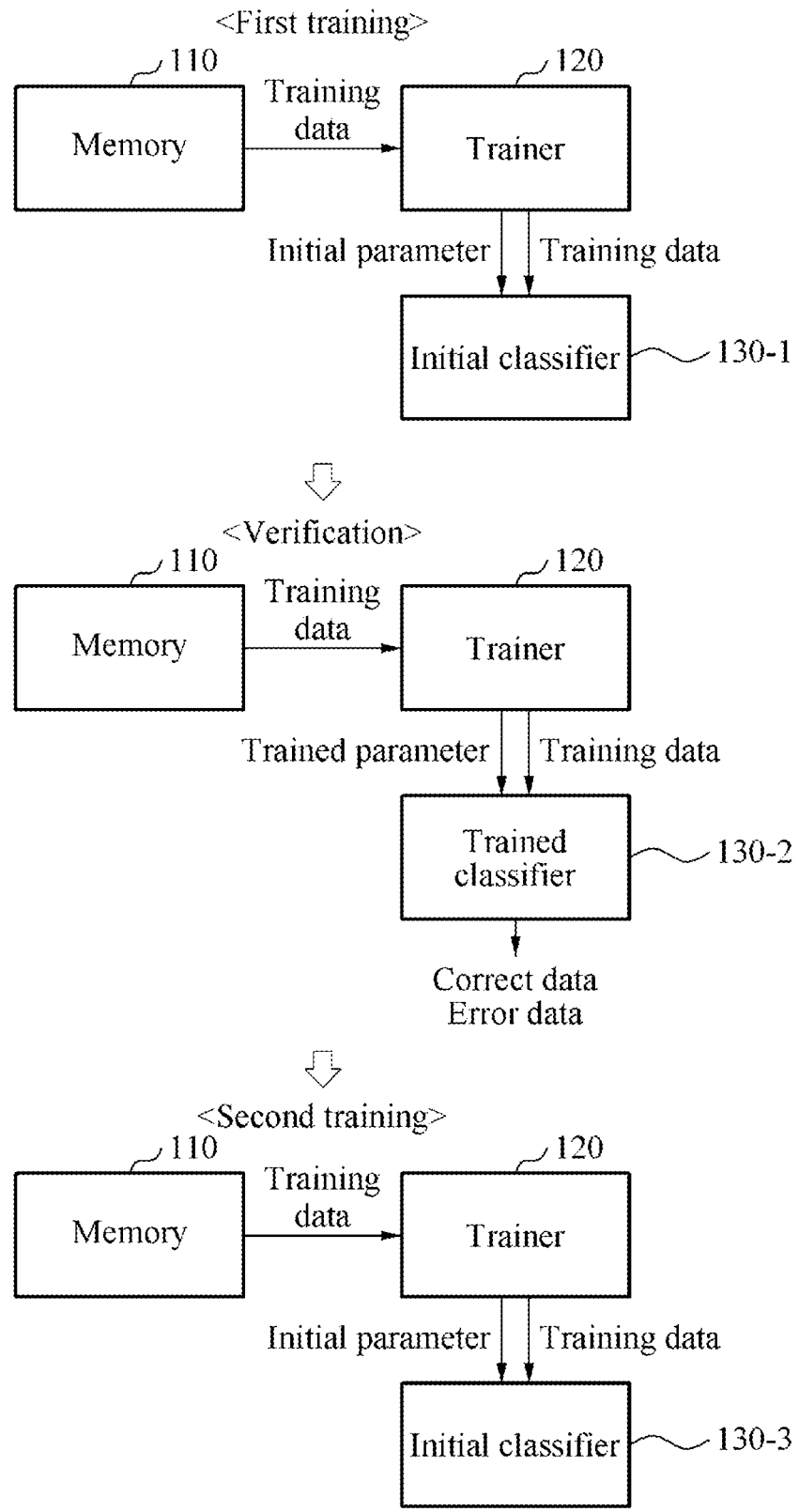
FIG. 2 is a diagram illustrating a process of training a classifier according to at least one example embodiment.

FIG. 2 is a diagram illustrating a process of training a classifier according to at least one example embodiment.

Referring to FIG. 2, at a first training stage, the trainer 120 of FIG. 1 trains an initial classifier 130-1 using training data. The initial classifier 130-1 indicates a classifier to which an initial parameter is applied. The initial parameter indicates a parameter to be applied to the initial classifier 130-1 prior to the training of the initial classifier 130-1. The initial parameter may be determined based on a type of a target object.

A parameter of the initial classifier 130-1, which is set as the initial parameter, may change as the training proceeds. When the initial classifier 130-1 is trained using the training data, the trainer 120 obtains a trained parameter. For example, the trained parameter may be a final parameter possessed by the initial classifier 130-1 after the training based on the training data is completed.

As described in the foregoing, the training data may include positive data and negative data. The positive data and the negative data may be present at a preset ratio. In comparison to the positive data in the training data, the negative data may dominate a considerably greater proportion of the training data. For example, an amount of the negative data may be thousands times larger than an amount of the positive data in the training data. In such a case of the large proportion of the negative data in the training data, a false acceptance rate (FAR) of a classifier may decrease, and thus accuracy of the classifier may increase.

At a verification stage, the trainer 120 classifies the training data using a trained classifier 130-2. The trained classifier 130-2 indicates a classifier to which a trained parameter is applied. The trainer 120 detects error data by classifying the training data as any one of the error data and correct data based on a result of classification by the trained classifier 130-2.

The correct data indicates training data obtained when the target object is correctly detected by the trained classifier 130-2. The error data indicates training data obtained when detection of the target object by the trained classifier 130-2 fails. For example, such a failure in the detection of the target object may include a case in which classification of an object included in the training data fails and a case in which the object included in the training data is incorrectly classified as another object.

Each set of the training data may include information on a type of an object included in the training data. The trainer 120 determines the result of the classification by the trained classifier 130-2 to be correct or incorrect based on the information included in the training data. For example, the trainer 120 may detect training data to be correct data based on determination that the result of the classification of the training data is correct, and detect training data to be error data based on determination that the result of the classification of the training data to be incorrect. For example, the trainer 120 may detect training data to be correct data when the classification of the training data by the trained classifier 130-2 is correct, and detect training data to be error data when the classification of the training data by the trained classifier 130-2 is incorrect.

The trainer 120 may include a verifier configured to verify the trained classifier 130-2. At the verification stage, the verifier verifies the trained classifier 130-2. The verifier verifies the trained classifier 130-2 based on an FAR. For example, the verifier determines whether the trained classifier 130-2 has an FAR less than or equal to a preset threshold value. When the trained classifier 130-2 has an FAR greater than the threshold value, the trainer 120 may additionally train the trained classifier 130-2 using the training data. In such an example, the trained parameter may be additionally adjusted.

The verifier adjusts the trained parameter to allow the trained classifier 130-2 to have a sufficiently small FAR. For example, when the trained parameter is additionally adjusted, the trainer 120 may determine whether the FAR is sufficiently small by newly detecting a classification result, for example, correct data and error data. By satisfying the small FAR at the first training stage and the verification stage, training after second training may be more readily performed and performance of a final classifier may be improved.

At a second training stage, the trainer 120 trains an initial classifier 130-3 using the error data instead of using the entire training data. The initial classifier 130-3 may be a classifier of a machine learning model which is identical to the initial classifier 130-1 used at the first training stage or a classifier of a different type from the initial classifier 130-1. When the initial classifier 130-3 is trained using the error data, the trainer 120 obtains a trained parameter. For example, the trained parameter may be a final parameter possessed by the initial classifier 130-3 after the training based on the error data is completed.

In an example, the initial classifier 130-1 and the initial classifier 130-3 may be trained using data in different categories. For example, the trainer 120 may train the initial classifier 130-3 based on the positive data in the error data at the second training stage. In such an example, a classification performance with respect to the error data which is not detected by the initial classifier 130-1 may be improved. In addition, when the initial classifier 130-1 and the initial classifier 130-3 are machine learning model classifiers of a same type, the initial classifier 130-1 and the initial classifier 130-3 may be trained based on different characteristics to improve performance of a final classifier.

Although not illustrated, the trainer 120 verifies a classifier trained through the second training, which will be hereinafter referred to as a second trained classifier. The trainer 120 detects correct data and error data by classifying the training data using the second trained classifier. The trainer 120 verifies the second trained classifier by calculating an FAR based on the correct data and the error data. The trainer 120 additionally trains the second trained classifier based on a result of the verifying of the second trained classifier.

Although described in detail with reference to FIG. 3, training data classified as error data by the trained classifier 130-2 may be classified as error data also by the second trained classifier. Alternatively, training data classified as correct data by the trained classifier 130-2 may be classified as error data by the second trained classifier.

For example, when object classification is successfully performed by the trained classifier 130-2 and object classification by the second trained classifier fails, training may proceed to allow error data obtained in such an example to be approximately 10% of the correct data obtained by the trained classifier 130-2.

For another example, when object classification by both the trained classifier 130-2 and the second trained classifier fails, training may proceed to allow error data obtained in such an example to be approximately 10% of the error data obtained by the trained classifier 130-2. In addition, training may proceed to allow the error data obtained by the second trained classifier to be considerably large in comparison to a feature dimension.

Although not illustrated, third or more training may proceed. For example, the trainer 120 may obtain a third parameter by training the initial classifier 130-3 with the error data obtained by the second trained classifier. The error data obtained by the second trained classifier may include training data obtained when the object classification performed by the trained classifier 130-2 and the second trained classifier fails. Thus, a classifier trained through the third or more training may be robust against an environment in which a target object is not readily detected, for example, a low light level environment and an uneven exposure environment.

Although an initial classifier or a trained classifier configured by applying different parameters to a single classifier, for example, the classifier 130 of FIG. 1, is described in the foregoing, a plurality of classifiers may be used. In such a case, a training stage and a verification stage may be performed in parallel. For example, an operation of detecting error data using the trained classifier 130-2 at the verification stage and an operation of training the initial classifier 130-3 at the second training stage may be performed in parallel.

For ease of description, a classifier trained through first training will be referred to as a first classifier, a classifier trained through second training as the second trained classifier or a second classifier, and a classifier trained through third training as a third classifier. The first, second, and third classifiers (to which different parameters may be applied, respectively) may be configured as a single classifier, for example, the classifier 130. Alternatively, a plurality of classifiers may be configured to operate in parallel with one another. In addition, a classification result obtained by the first classifier may be referred to as first correct data and first error data, and a classification result obtained by the second classifier may be referred to as second correct data and second error data.

Figure 3:
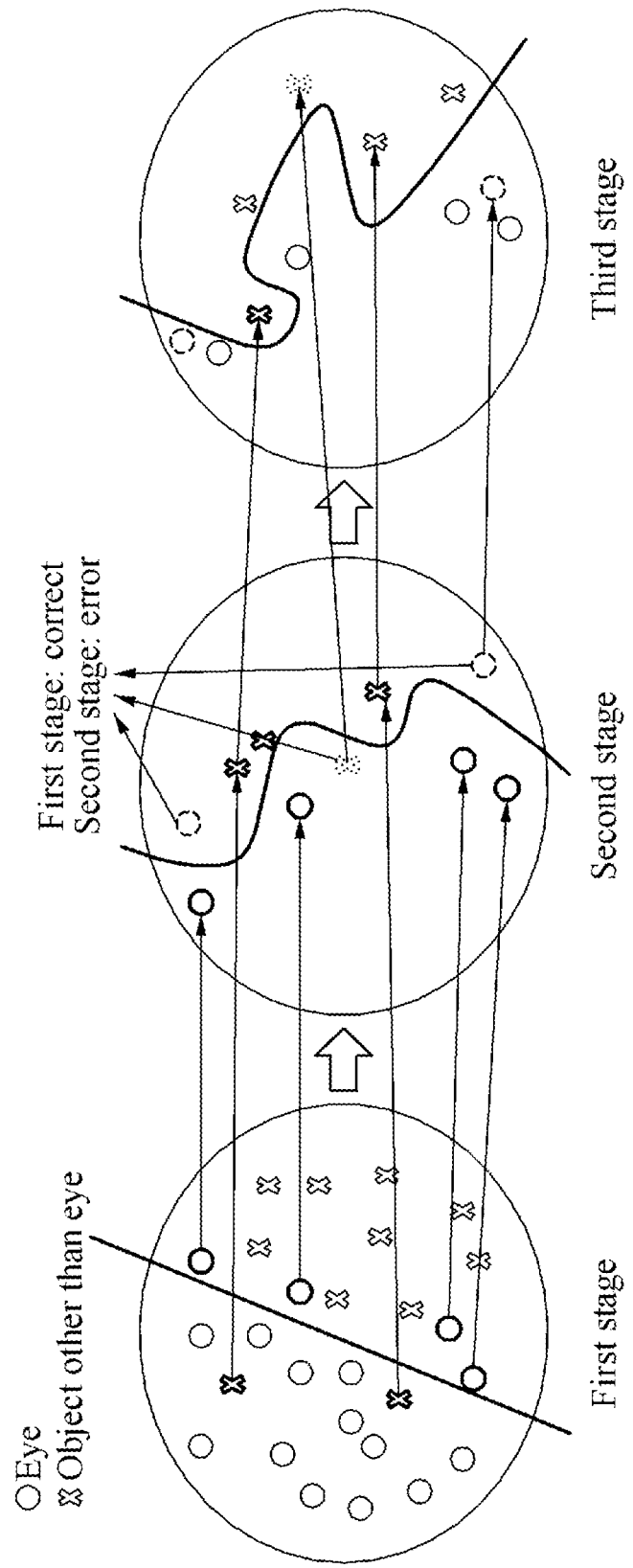
FIG. 3 is a diagram illustrating a process of classifying training data according to at least one example embodiment.

FIG. 3 is a diagram illustrating a process of classifying training data according to at least one example embodiment.

FIG. 3 illustrates a process of classifying training data at a first stage, a second stage, and a third stage. In FIG. 3, a target object is an eye of a user. At each stage, the first, the second, and the third classifiers described in the foregoing classify training data. As described in the foregoing, the first classifier is trained based on the training data, the second classifier is trained based on first error data, and the third classifier is trained based on second error data.

At the first stage, the first classifier detects the target object from a portion of the training data, and fails to detect the target object from another portion of the training data. In FIG. 3, at the first stage, data the first classifier fails to detect, which is the first error data, is indicated by bold outlining and arrows pointing to the second state. At the first stage, a classification boundary of the first classifier is indicated by a basic line.

The operation at the first stage may be expressed as an algorithm illustrated in Table 1.

TABLE 1

Input: Sample data from $D_{total\_training\_db}$, construct each
   sub-training DB, $D^1_1, D^1_2, \ldots D^1_{n1}$ with n1 sub-stages.
for i = 1 ← 1, 2, ..., n1 do
   for t = 1 ← 1, 2, ..., T do
     1. Feature extraction (Haar, or LBP) from $D^1_t$
     2. Weak learner: $h_t(x)$ with error $\varepsilon_t$ 3. Classifier Boosting $\alpha_t = \log\left(\frac{1-\varepsilon_t}{\varepsilon_t}\right)$ end Strong classifier: $F_t(x) = 1, \text{ if } \sum_{t=1}^{T} \alpha_t h_t(x) \geq 0$,
            $F_t(x) = 0, \text{ otherwise}$ end Output: Cascaded strong classifier $F^{earlystage}_{final}(x) = \sum_{t=1}^{n1} F_t(x)$ In Table 1, "$D_{tota\_training\_db}$" indicates training data, "$D^1_t$" indicates training data at a t-th substage among a plurality of substages for boosting, "$h_t(x)$" indicates a weak classifier for the t-th substage, and "at" denotes a boosting parameter for $h_t(x)$.

At the second stage, the second classifier detects the target object from a portion of the first error data, and fails in detecting the target object from another portion of the first error data. The second classifier may have improved performance through training based on the first error data. Data that the second classifier fails to classify correctly with respect to the target object is indicated by a dotted line. The second classifier may fail to correctly classify, with respect to the target object, data that the first classifier correctly classified. At the second stage, a classification boundary of the second classifier is indicated by a line more complex than the classification boundary of the first classifier.

The operation at the second stage may be expressed as an algorithm illustrated in Table 2.

TABLE 2

Validation: Evaluate $D_{tota\_training\_db}$ using $F_{final}^{earlystage}$ and
   construct an Error DB2 ($D_{error\_by\_earlystage}$) with $F_{final}^{earlystage}(x) \neq$ label(x)
   or possible erroneous data $|F_{final}^{earlystage}(x)\text{-label}(x)|>>0$
Input: Sample data from $D_{error\_by\_earlystage}$ construct each
   sub-training DB, $D^2_1, D^2_2, \ldots D^2_{n2}$ with n2 sub-stages.

TABLE 2-continued for i = 1 ← 1, 2, . . . , n1 do
  for t = 1 ← 1,2, . . . , T do
    1. Feature extraction (Haar, or LBP) from $D^2_t$
    2. Weak learner: $h_t(x)$ with error $\varepsilon_t$ 3. Classifier Boosting: $\alpha_t = \log\left(\dfrac{1-\varepsilon_t}{\varepsilon_t}\right)$ Strong classifier: $F_t(x) = 1,\ \text{if}\ \sum_{t=1}^{T} \alpha_t h_t(x) \geq 0$
$F_t(x) = 0,\ \text{otherwise}$ Output: Cascaded strong classifier $F_{final}^{Middlestage}(x) = \sum_{t=1}^{n2} F_t(x)$ At the third stage, the third classifier detects the target object from most portions of the second error data. The third classifier may have improved performance through training based on the second error data. The third classifier may correctly classify, with respect to the target object, data that was correctly classified by the first classifier and incorrectly classified by the second classifier. At the third stage, a classification boundary of the third classifier is indicated by a line more detailed than the classification boundary of the second classifier.

The operation at the third stage may be expressed as an algorithm illustrated in Table 3.

TABLE 3

Validation: Evaluate $D_{total\_training\_db}$ using $F_{final}^{Middlestage}(x)$
  construct an Error DB3 ($D_{error\_by\_middlestage}$) with $F_{final}^{Middlestage}(x) \neq$ label (x)
  or possible erroneous data $|F_{final}^{middlestage}(x) - \text{label}(x)| >> 0$
Merge Error DB2 into Error DB3 ($D_{error\_db3} = D_{error\_by\_middlestage} + D_{error\_by\_earlystage}$)
Input: Sample data from $D_{error\_db3}$, construct each
  sub-training DB, $D^3_1, D^3_2, \ldots D^3_{n3}$ with n3 sub-stages.
for i = 1 ← 1, 2, . . . , n3 do
  for t = 1 ← 1,2, . . . , T do
    1. Feature extraction (Haar or LBP) from $D^2_t$
    2. Weak learner: $h_t(x)$ with error $_t$ 3. Classifier Boosting: $\alpha_t = \log\left(\dfrac{1-\varepsilon_t}{\varepsilon_t}\right)$ Strong classifier: $F_t(x) = 1,\ \text{if}\ \sum_{t=1}^{T} \alpha_t h_t(x) \geq 0$
$F_t(x) = 0,\ \text{otherwise}$ Output: Cascaded strong classifier $F_{final}^{Finalstage}(x) = \sum_{t=1}^{n3} F_t(x)$ FIG. 4 is a diagram illustrating a training process using boosting according to at least one example embodiment.

Figure 4:
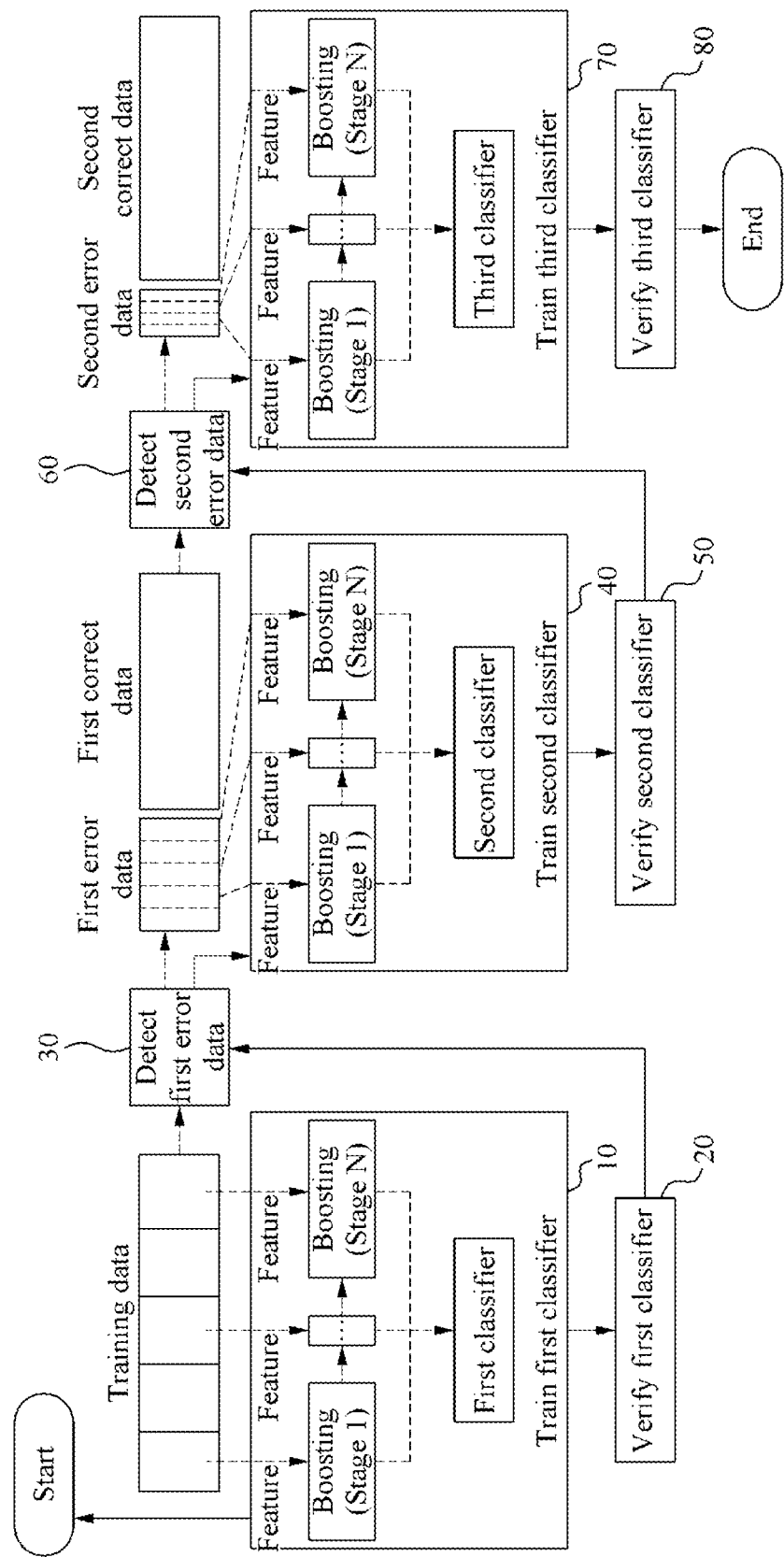
FIG. 4 is a diagram illustrating a training process using boosting according to at least one example embodiment.

FIG. 4 illustrates a training process of classifiers at each stage, and a process of classifying data. As described in the foregoing, each classifier may be trained based on various machine learning methods. FIG. 4 illustrates an example of a process of training the classifiers through feature extraction and boosting. The classifiers may learn error data based on various methods in addition to an example illustrated in FIG. 4.

Referring to FIG. 4, in operation 10, a first classifier is trained. A trainer extracts a feature from training data. The trainer boosts weak classifiers based on the extracted feature. The trainer adjusts weighted values of the weak classifiers in a process of the boosting. The weak classifiers may have a plurality of boosting stages. The trainer obtains a first parameter based on a series of the weak classifiers, and applies the first parameter to the first classifier which is a strong classifier. The trainer applies a cascade structure to the first classifier.

In operation 20, the first classifier is verified. The trainer verifies the first classifier. As described in the foregoing, the trainer verifies the first classifier based on the training data and a result of classification performed by the first classifier.

In operation 30, first error data is detected. The first classifier classifies the training data into the first error data and first correct data. The trainer detects the first error data from the training data through the first classifier.

In operation 40, a second classifier is trained. The trainer extracts a feature from the first error data. Similar to operation 10, the trainer extracts the feature from the first error data, and boosts weak classifiers. The trainer obtains a second parameter based on a series of the weak classifiers, and applies the second parameter to the second classifier which is a strong classifier. The trainer applies a cascade structure to the second classifier.

In operation 50, the second classifier is verified. The trainer verifies the second classifier. The trainer verifies the second classifier based on the training data and a result of classification performed by the second classifier.

In operation 60, second error data is detected. The second classifier classifies the training data into the second error data and second correct data. The trainer detects the second error data from the training data through the second classifier.

In operation 70, a third classifier is trained. The trainer extracts a feature from the second error data. Similar to operation 10, the trainer extracts the feature from the second error data, and boosts weak classifiers. The trainer obtains a third parameter based on a series of the weak classifiers, and applies the third parameter to the third classifier which is a strong classifier.

In operation 80, the third classifier is verified. The trainer verifies the third classifier. The trainer verifies the third classifier based on the training data and a result of classification performed by the third classifier.

The verified third classifier may be applied to various applications. For example, a final classifier may be provided to, for example, a smartphone, a smart television (TV), a desktop, a laptop, and a tablet personal computer (PC), to detect an object. Examples of an object detecting apparatus applied to such applications will be described with reference to FIGS. 5 and 6.

Figure 5:
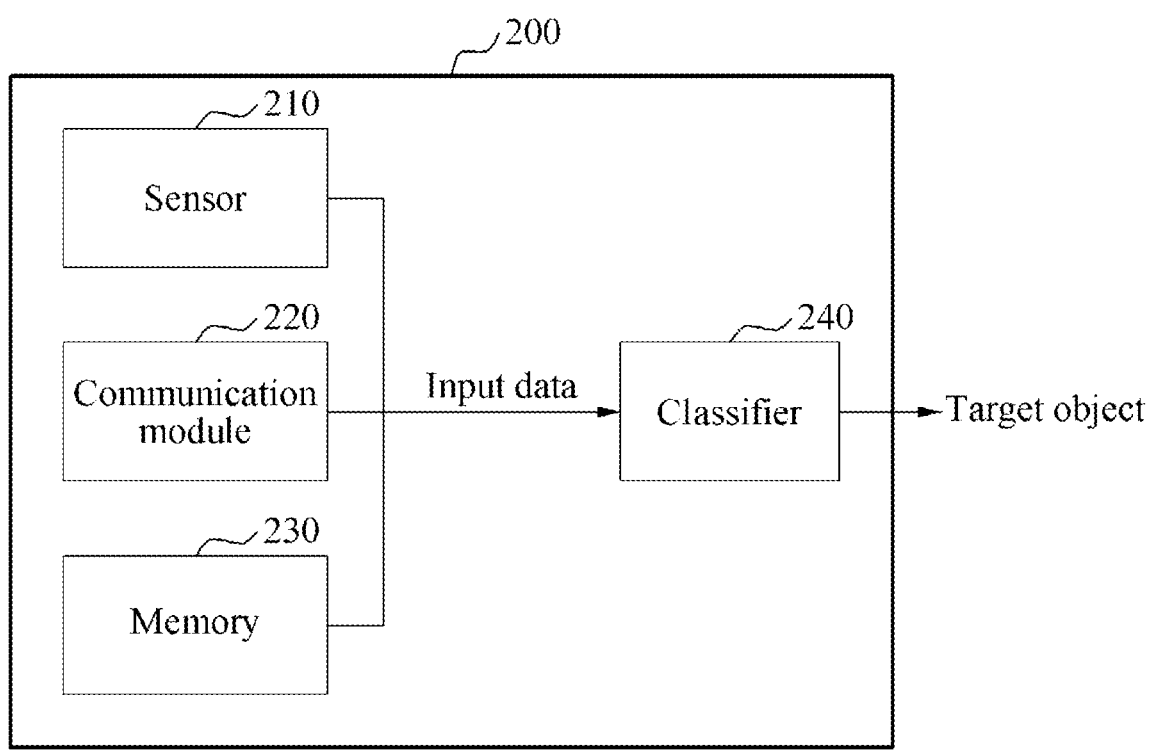
FIG. 5 is a diagram illustrating an example of an object detecting apparatus according to at least one example embodiment.

FIG. 5 is a diagram illustrating an example of an object detecting apparatus 200 according to at least one example embodiment.

Referring to FIG. 5, the object detecting apparatus 200 includes a sensor 210, a communication module 220, a memory 230, and a classifier 240. The object detecting apparatus 200 may be included in, for example, a smartphone, a smart TV, a desktop, a laptop, and a tablet PC. The classifier 240 may be configured as at least one software module or hardware module.

As described in the foregoing, the classifier 240 is trained based on error data. For example, a trained parameter may be applied to the classifier 240. The classifier 240 trained based on the error data detects a target object from input data received from the sensor 210, the communication module 220, and the memory 230. The input data may be various based on a target object learned by the classifier 240. For example, the input data may include a face of a user, an eye of the user, a voice or a speech of the user, and an object such as a vehicle.

The sensor 210 includes, for example, an image sensor such as a camera and a voice recognition sensor such as a microphone. The sensor 210 provides the classifier 240 with detected image data and audio data as the input data.

The communication module 220 communicates with an external device through various communication methods. The communication module 220 provides the classifier 240 with data received from the external device as the input data.

The memory 230 stores various sets of image data and audio data. The memory 230 provides the classifier 240 with the stored image data and audio data as the input data.

Figure 6:
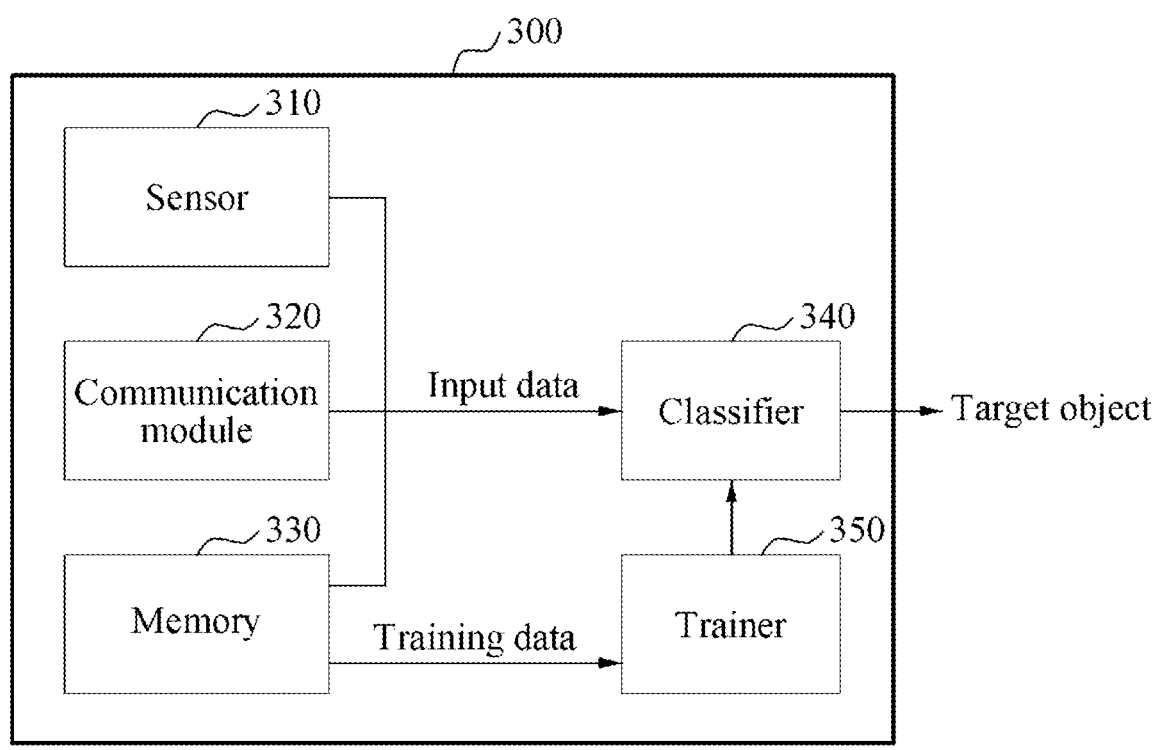
FIG. 6 is a diagram illustrating another example of an object detecting apparatus according to at least one example embodiment.

FIG. 6 is a diagram illustrating another example of an object detecting apparatus 300 according to at least one example embodiment.

Referring to FIG. 6, the object detecting apparatus 300 includes a sensor 310, a communication module 320, a memory 330, a classifier 340, and a trainer 350. The object detecting apparatus 300 may be included in, for example, a smartphone, a smart TV, a desktop, a laptop, and a tablet PC. The classifier 340 and the trainer 350 may be configured as at least one software module or hardware module.

The trainer 350 trains the classifier 340 based on error data. The trainer 350 detects the error data from training data, and trains the classifier 340 based on the error data. The details described in the foregoing may be applicable to a process of training the classifier 340.

The classifier 340 detects a target object from input data received from the sensor 310, the communication module 320, and the memory 330.

The details described with reference to FIG. 5 may be applicable to the descriptions of the input data, the sensor 310, the communication module 320, and the memory 330. In addition, the memory 330 stores the training data, and provides the trainer 350 with the training data.

Figure 7:
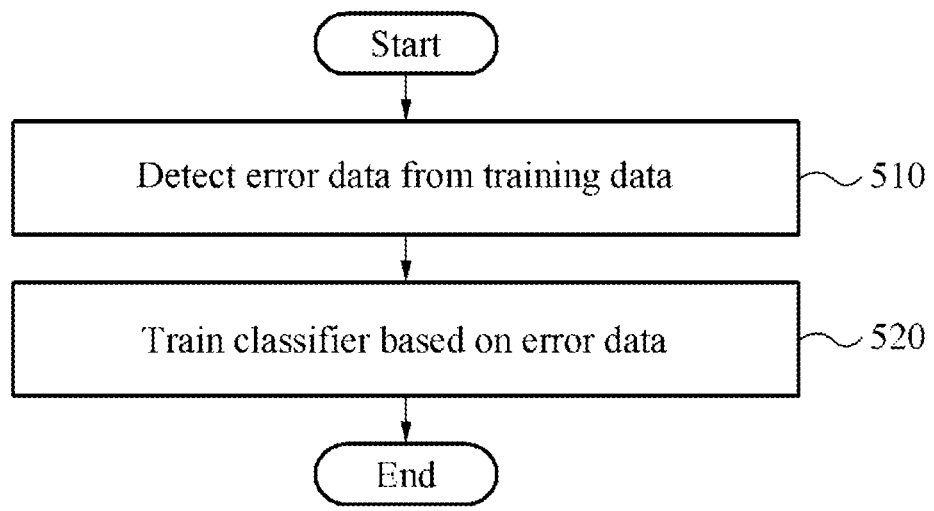
FIG. 7 is a flowchart illustrating a classifier training method according to at least one example embodiment.

FIG. 7 is a flowchart illustrating a classifier training method according to at least one example embodiment. Referring to FIG. 7, in operation 510, error data is detected from training data. In operation 520, a classifier is trained based on the error data. The operations described in the foregoing may be performed by a classifier training apparatus.

Figure 8:
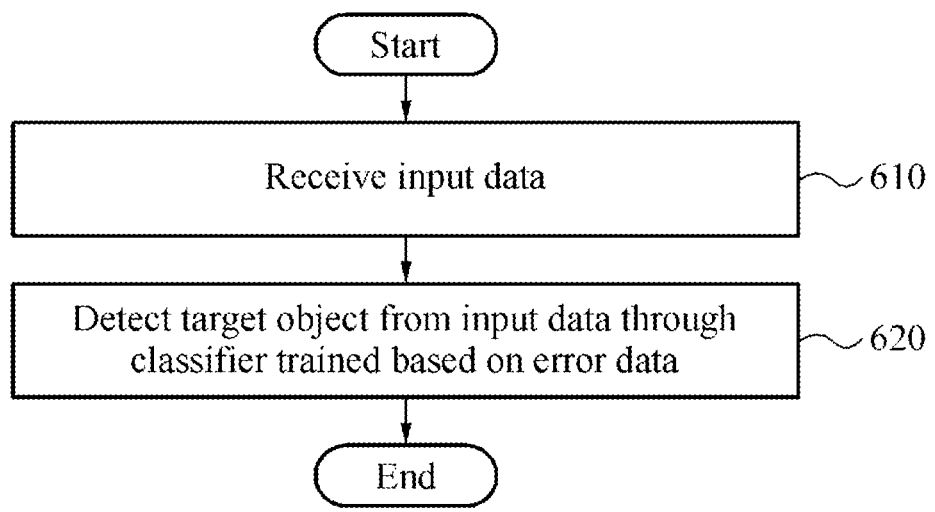
FIG. 8 is a flowchart illustrating an object detecting method according to at least one example embodiment.

FIG. 8 is a flowchart illustrating an object detecting method according to at least one example embodiment. Referring to FIG. 8, in operation 610, input data is received. In operation 620, a target object is detected from the input data. The target object is detected through a classifier trained based on error data. The operations described in the foregoing may be performed by an object detecting apparatus.

The details described with reference to FIGS. 1 through 6 may be applicable to the operations described with reference to FIGS. 7 and 8, and thus more detailed and repeated descriptions will be omitted here.

The units and/or modules described herein (including, for example, the trainers and classifiers described in the present disclosure) may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be, for example, those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A classifier training method, comprising:
 detecting error data from training data; and training a classifier configured to detect an object based on the error data,
wherein the detecting comprises:
training a first classifier based on the training data;
detecting first error data by classifying a first set of the training data using the first classifier, the first error data being data from among the first set of the training data that was not classified correctly by the first classifier;
training a second classifier based on the first error data without using the entire first set of the training data; and
detecting second error data by classifying the first set of the training data using the second classifier, the second error data being data from among the training data that was not classified correctly by the second classifier,
wherein the second error data includes,
a first subset of data, from among the first set of the training data, that is correctly classified by the first classifier and is not correctly classified by the second classifier, and
a second subset of data, from among the first set of the training data, that is not correctly classified by the first classifier and is not correctly classified by the second classifier.

2. The method of claim 1, further comprising:
training a third classifier based on the second error data.

3. The method of claim 1, further comprising:
verifying at least one of the trained first classifier or the trained second classifier.

4. The method of claim 3, wherein the verifying comprises:
adjusting a parameter of the at least one of the trained first classifier or the trained second classifier such that a false acceptance rate (FAR) corresponding to the at least one of the trained first classifier or the trained second classifier is less than or equal to a threshold value.

5. The method of claim 1, further comprising:
setting a first ratio,
wherein the training data includes positive data and negative data such that a ratio of the positive data to the negative data is the first ratio.

6. An object detecting method, comprising:
receiving input data; and
detecting a target object from the input data using a classifier trained based on error data,
the classifier including a first classifier that has been trained based on training data and a second classifier that has been trained by,
detecting first error data by classifying a first set of the training data using the first classifier, the first error data being data from among the first set of training data that was not classified correctly by the first classifier,
training the second classifier based on the first error data without using the entire first set of the training data, and
detecting second error data by classifying the first set of the training data using the second classifier, the second error data being data from among the training data that was not classified correctly by the second classifier, wherein the second error data includes,
a first subset of data, from among the first set of the training data, that is correctly classified by the first classifier and is not correctly classified by the second classifier, and
a second subset of data, from among the first set of the training data, that is not correctly classified by the first classifier and is not correctly classified by the second classifier.

7. The method of claim 6, the classifier further comprising:
a third classifier trained based on the second error data.

8. A classifier training apparatus, comprising:
a memory configured to store training data; and
a trainer configured to detect error data from the training data and train a classifier such that the classifier is configured to detect an object based on the error data,
the detecting of the error data including,
training a first classifier based on a first set of the training data;
detecting first error data by classifying a first set of the training data using the first classifier, the first error data being data from among the first set of the training data that was not classified correctly by the first classifier;
training a second classifier based on the first error data without using the entire first set of the training data; and
detecting second error data by classifying the first set of the training data using the second classifier, the second error data being data from among the training data that was not classified correctly by the second classifier,
wherein the second error data includes,
a first subset of data, from among the first set of the training data, that is correctly classified by the first classifier and is not correctly classified by the second classifier, and
a second subset of data, from among the first set of the training data, that is not correctly classified by the first classifier and is not correctly classified by the second classifier.

9. The apparatus of claim 8, wherein the trainer is configured to train a third classifier based on the second error data.

10. The apparatus of claim 8, wherein the trainer is configured to adjust a parameter of at least one of the trained first classifier or the trained second classifier such that a false acceptance rate (FAR) corresponding to the at least one of the trained first classifier or the trained second classifier is less than or equal to a preset threshold value.

11. The apparatus of claim 8, wherein the training data comprises positive data and negative data at a preset ratio.

* * * * *